United States Patent [19]
Keogh

[11] Patent Number: 4,942,069
[45] Date of Patent: Jul. 17, 1990

[54] FLAME RETARDANT COMPOSITIONS

[75] Inventor: Michael J. Keogh, Bridgewater, N.J.

[73] Assignee: Union Carbide Chemicals and Plastics Company, Inc., Danbury, Conn.

[21] Appl. No.: 280,979

[22] Filed: Dec. 7, 1988

[51] Int. Cl.⁵ ............................................. A01N 3/00
[52] U.S. Cl. .................................. 428/389; 428/921; 521/92; 521/93; 521/97; 521/98; 521/143; 521/145; 521/146; 521/149; 521/150; 521/907
[58] Field of Search ..................... 521/92, 98, 93, 97, 521/907; 428/19.1, 921

[56] References Cited

U.S. PATENT DOCUMENTS

| 3,983,294 | 9/1976 | Goswami | 521/145 |
|---|---|---|---|
| 4,182,799 | 1/1980 | Rodish | 521/146 |
| 4,353,817 | 10/1982 | Nakae et al. | 524/399 |
| 4,446,254 | 5/1984 | Nakae et al. | 524/437 |
| 4,477,523 | 10/1984 | Biggs | 524/322 |
| 4,542,164 | 9/1985 | Nishioka et al. | 524/109 |
| 4,722,959 | 2/1988 | Inoue et al. | 524/436 |
| 4,764,539 | 8/1988 | Ladang | 521/145 |
| 4,769,179 | 9/1988 | Kato et al. | 524/140 |
| 4,801,639 | 1/1989 | Hoshi et al. | 524/437 |
| 4,840,987 | 6/1989 | Sakamoto | 524/436 |

Primary Examiner—Morton Foelak
Attorney, Agent, or Firm—Saul R. Bresch

[57] ABSTRACT

A composition useful in the manufacture of cable comprising:
(i) a thermpolastic polymer;
(ii) a metal hydrate flame retardant compound; and
(iii) a blowing agent, which decomposes at a temperature in the range of about 160° C. to the decomposition temperature of the thermpolastic polymer.

10 Claims, No Drawings

FLAME RETARDANT COMPOSITIONS

TECHNICAL FIELD

This invention relates to flame retardant compositions containing an ethylene copolymer and magnesium hydroxide filler. The compositions are particularly useful in plenum cable.

BACKGROUND ART

Plenum cable is used to carry power through ducts which are used to ventilate, for example, high rise buildings. While a fire occurring in these ducts can be dangerous in its own right, such a conflagration is especially insidious because the smoke and other gases resulting from the fire are transported through the ducts throughout the building, even to parts quite remote from the blaze. In some cases, colorless and odorless gases can invade sleeping quarters housing unsuspecting people.

The cable used in plenums is generally constructed of a metal conductor insulated with a polymeric material. These elements are generally twisted to form a core and are protected by another polymeric sheath or jacket material. In certain cases, added protection is afforded by inserting a wrap between the core and the sheath.

Thermoplastic non-halogen polyolefin compounds containing a metal hydrate flame retardant such as magnesium hydroxide or aluminum hydroxide rely on an endothermic heat sink mechanism for flame resistance. Any interference with this mechanism can lead to a significant to loss of effectiveness. Dripping, uneven combustion, loss of ash, and premature release of the hydrate are examples of interference, which lower flame resistance.

The art is constantly seeking to reinforce the heat sink mechanism to maintain flame resistance, particularly where duct fires are concerned.

DISCLOSURE OF INVENTION

An object of this invention, therefore, is to provide a composition, which comprises a thermoplastic polyolefin and a metal hydrate flame retardant, and is capable of maintaining its flame resistance when subjected to interfering factors thrust upon it by a duct fire or other conflagration.

Other objects and advantages will become apparent hereinafter.

According to the invention, a composition has been discovered, which meets the above objective. The composition comprises
(i) a thermoplastic polymer;
(ii) a metal hydrate flame retardant compound; and
(iii) a blowing agent, which decomposes at a temperature in the range of about 160° C. to the decomposition temperature of the thermoplastic polymer.

DETAILED DESCRIPTION

In this specification, the term "polymer" is used to include thermoplastic polymers, i.e., homopolymers and copolymers based on two or more comonomers, conventionally used as jacketing and/or insulating materials in wire and cable products. Generally, the monomers will have 2 to 18 carbon atoms, and preferably 2 to 8 carbon atoms. Examples of monomers useful in the production of these homopolymers and copolymers are ethylene, propylene, 1 butene, 1-hexene, 1 octene, vinyl acetate, ethyl acrylate, ethylidene norbornene, methyl acrylate, styrene, maleic anhydride, acrylonitrile, butadiene, methyl methacrylate, vinyl chloride, vinylidene chloride, tetrafluoroethylene, and ethylene chlorotriflouroethylene. The homopolymers and copolymers referred to can be non-halogenated, or halogenated in a conventional manner, generally with chlorine or bromine. In the case of polyvinyl chloride, polyvinylidene chloride, or polytetraflouroethylene, for example, further halogenation is not necessary to provide the halogenated polymer. In addition to polyolefins, included among the polymers can be polyester, polycarbonates and polyurethanes. The homopolymers and copolymers of ethylene are preferred, both in the non-halogenated and halogenated form.

The metal hydrate flame retardant compound can be any of those used conventionally such as magnesium hydroxide (magnesium hydrate) and aluminum hydroxide (alumina trihydrate). A particularly preferred magnesium hydroxide and a method for its preparation are described in U.S. Pat. No. 4,098,762 issued on July 4, 1978. Characteristics of this magnesium hydroxide are (a) a strain in the <101> direction of no more than $3.0 \times 10^{-3}$; (b) a crystallite size in the <101> direction of more than 800 angstrom; and (c) a surface area, determined by the BET method, of less than 20 square meters per gram.

The amount of metal hydrate used in the composition is in the range of about 180 to about 350 parts by weight of metal hydrate per one hundred parts by weight of polymer and is preferably in the range of about 200 to about 320 parts by weight of metal hydrate per one hundred parts by weight of polymer.

The metal hydrate is preferably surface treated with a saturated or unsaturated carboxylic acid having about 8 to about 24 carbon atoms and preferably about 12 to about 18 carbon atoms or a metal salt thereof. Mixtures of these acid and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts by weight of acid and/or salt per one hundred parts by weight of metal hydrate and preferably about 0.25 to about 3 parts by weight per one hundred parts by weight of metal hydrate. The acid or salt can be merely added to the composition in like amounts rather than using the surface treatment procedure, but this is not preferred.

Component (iii) is a blowing agent, which decomposes at a temperature of at least about 160° C. Blowing agents with higher minimum decomposition temperatures can, of course, be used. Those having decomposition temperatures of at least about 180° C. are preferred. The upper limit for decomposition of the blowing agent is the decomposition temperature of the thermoplastic polymer.

The chemical blowing agent selected is usually organic and one, which, under extrusion conditions and normal temperatures of use, will remain essentially inert, but will decompose at burning or conflagration temperatures releasing a relatively inert gas such as carbon dioxide or nitrogen. This causes the filled polymer to expand or foam thereby exposing a higher surface area to the fire resulting ultimately in the production of more thermal and gas insulating ash in a shorter period of time than would be obtained from a low surface area polymer. High ash formation serves as an excellent thermal and oxygen barrier, and, moreover, acts to prevent drip from hot thermoplastic material.

Examples of blowing agents useful in this invention are: azodicarbonamide; diphenylene oxide-4,4-disulfohydrazide; trihydrazinotriazine; p-toluenesulfonylsemicarbazide; 5-phenyltetrazole; and isatoic anhydride.

The amount of blowing agent, which can be used in subject composition is in the range of about 0.1 to about 5 parts by weight of blowing agent based on 100 parts by weight of polymer and is preferably in the range of about 0.5 to about 2 parts by weight.

Other useful additives for subject composition are coupling agents, surfactants, free radical generators, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants. Some of the more important additives are discussed below.

A coupling agent is a chemical compound, which chemically binds polymer components to inorganic components. This is effected by a chemical reaction taking place at the temperatures under which the formulation is compounded, about 70° C. to about 180° C. The coupling agent generally contains an organofunctional ligand at one end of its structure which interacts with the backbone of the polymeric component and a ligand at the other end of the structure of the coupling compound which attaches through reaction with the surface of the filler. The following silane coupling agents are useful in subject composition: gamma-methacryloxypropyltrimethoxy silane; methyltriethoxy silane; methyltris (2-methoxyethoxy) silane; dimethyldiethoxy silane; vinyltris(2- methoxyethoxy) silane; vinyltrimethoxy silane; and vinyltriethoxy silane; and mixtures of the foregoing. A preferred silane coupling agent is a mixture of gamma-methacryloxypropyltrimethoxy silane and vinyltriethoxysilane. This mixture is described in U.S. Pat. No. 4,481,322.

Useful reinforcing additives include polymerizable unsaturated organic compounds having at least two polymerizable unsaturated groups. It is believed that the reinforcing additive reacts chemically with the thermoplastic polymer matrix during the hot melt compounding of the filled thermoplastic polymer. It is further believed that the reinforcing additive causes the formation of a strong and tough interphase between the individual filler particles and the surrounding matrix polymer, enabling the polymer to withstand the local stress concentrations caused by the filler particles, which might otherwise result in matrix crack initiation and catastrophic failure. It is believed that such increases in the toughness of the interphase enable the simultaneous achievement of high stress and ductility in the final composite. Filler treatments which rely solely on increased adhesion, i.e., coupling, between the filler surface and the matrix polymer, can increase the composite strength, but, if there is no improvement in interphase toughness, the composite will remain brittle. This concept is discussed in U.S. Pat. No. 4,385,136. The reinforcing additives include any organic compounds of the above description which do not contain any group or element adversely affecting the function of the polymer; filler; silane; or any other component of the composition. Suitable unsaturated organic compounds include ester diol 2,4-diacrylate, 1,4 butylene glycol diacrylate, diethylene glycol dimethacrylate, triallyl-s-triazine 2,4,6-(1H, 3H, 5H)-trione, triallyl mellitate, pentaerythritol triacrylate, polycaprolactone triacrylate, m-phenylene bis maleimide, dipentaerythritol pentacrylate, melamine triacrylate, epoxidized linseed oil/acrylate, triacryloyl hexahydro-s-triazine, trimethylolpropane trimaleate, trimethacryloyl hexahydro-s-triazine, N,N-tetraacryloyl 1,6-diaminopyridine, 1,3-butylene glycol dimethacrylate, 1,3-butylene glycol diacrylate, ethylene glycol dimethacrylate, ethylene glycol diacrylate, diethylene lycol diacrylate, triethylene glycol diacrylate, polyethylene glycol dimethacrylate, polyethylene lycol diacrylate, trimethylol propane trimethacrylate, trimethylol propane triacrylate, divinyl sulfone, dicyclopentadiene, bisalkyl glycol dicarbonate, triallyl cyanurate, acetyl triallyl citrate, divinyl benzene, dialkyl pthalate, tetraallyl methylenediamine, tetraallyl oxyethane, 3-methyl 1,4,6-heptatriene; 1-10-decamethylene glycol dimethacrylate and di-, tri-, tetra-, and pentaacrylates of poly(vinyl alcohol). In addition, the following low molecular weight polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, and partial alkyl esters of styrenemaleic anhydride oligomers.

It is preferred to employ polymerizable unsaturated organic compounds that have a high unsaturated level to molecular weight ratio. Therefore, the tri-, tetra-, and penta-acrylates of poly(vinyl alcohol) and the other tri-, tetra-, and penta-acrylates and methacrylates of polyols such as pentaerythritol, methylolpropane, and dipentaerythritol, as described above, are preferred.

The coupling agent and reinforcing additive are each used in amounts of about 0.05 part by weight to about 0.5 part by weight for each 100 parts by weight of copolymer. The effect can be maximized by the inclusion of suitable surfactants and free radical generators.

Examples of antioxidants are: hindered phenols such as tetrakis[methylene(3,5 di-tert-butyl-4-hydroxyhydrocinnamate)]methane and thiodiethylene bis(3,5 di-tert butyl-4-hydroxy)hydrocinnamate; phosphites and phosphonites such as tris(2,4-di-tert-butylphenyl)-phosphite and di-tert-butylphenylphosphonite; various amines such as polymerized 2,2,4-trimethyl-1,2-dihydroguinoline; and silica. A tetrakis methane compound is preferred. Antioxidants are used in amounts of about 1 to about 5 parts by weight per hundred parts by weight of copolymer.

Subject composition is also useful as a sheath surrounding a glass core in fiber optics applications.

The patents mentioned in this specification are incorporated by reference herein.

I claim:

1. A cable comprising a metal core conductor and at least one unfoamed layer surrounding the core consisting essentially of
   (i) a thermoplastic polymer;
   (ii) a metal hydrate flame retardant compound; and
   (iii) essentially unreacted blowing agent, which decomposes at a temperature in the range of about 160° C. to the decomposition temperature of the thermoplastic polymer.

2. The cable of claim 13 wherein the metal hydrate is present in an amount of about 180 to about 350 parts by weight per 100 parts by weight of polymer and the blowing agent is present in an amount of about 0.1 to about 5 parts by weight per 100 parts by weight of polymer.

3. The cable of claim 2 wherein the metal hydrate is present in an amount of about 200 to about 320 parts by weight and the blowing agent is present in an amount of about 0.5 to about 2 parts by weight.

4. The cable of claim 13 wherein the polymer is a homopolymer of ethylene or a copolymer based on a major proportion of ethylene.

5. The cable of claim 13 wherein the polymer is non-halogenated or halogenated.

6. The cable of claim 13 additionally containing at least one carboxylic acid having about 8 to about 24 carbon atoms or a metal salt thereof in an amount of 0.1 to about 5 part by weight based on 100 parts by weight of the metal hydrate.

7. The composition of claim 5 wherein the metal hydrate is surface treated with the carboxylic acid or metal salt.

8. The composition of claim 6 wherein the acid or salt is present in an amount of about 0.25 to about 3 parts by weight based on 100 parts by weight of the metal hydrate.

9. The cable of claim 1 wherein the metal hydrate is magnesium hydroxide.

10. The cable of claim 1 wherein the blowing agent is azodicarbonamide.

* * * * *

UNITED STATES PATENT AND TRADEMARK OFFICE
CERTIFICATE OF CORRECTION

PATENT NO. : 4,942,069

DATED : July 17, 1990

INVENTOR(S) : Michael John Keogh

It is certified that error appears in the above-identified patent and that said Letters Patent is hereby corrected as shown below:

Column 4, line 67, change "13" to -- 1 --.

Column 5, lines 9, 12, and 14, change "13" to -- 1 --.

Column 6, lines 4 and 7, change "composition" to --cable--.

Signed and Sealed this

Tenth Day of September, 1991

Attest:

HARRY F. MANBECK, JR.

Attesting Officer

Commissioner of Patents and Trademarks